United States Patent [19]

Lynch et al.

[11] Patent Number: 5,693,119
[45] Date of Patent: Dec. 2, 1997

[54] SOLID-PHASE P BUFFER FOR SUSTAINED LOW-LEACHING P FERTILIZATION OF PLANTS

[75] Inventors: Jonathan P. Lynch, State College; E. Jay Holcomb, Boalsburg, both of Pa.

[73] Assignee: The Penn State Research Foundation, University Park, Pa.

[21] Appl. No.: 540,524

[22] Filed: Oct. 10, 1995

[51] Int. Cl.$^6$ ............................................. C05B 7/00
[52] U.S. Cl. ........................ 71/32; 71/33; 71/62; 71/64.11
[58] Field of Search .......................... 71/32, 33, 62, 71/64.11; 47/595, 59 C, 59 CO, 64

[56] References Cited

U.S. PATENT DOCUMENTS

| | | | |
|---|---|---|---|
| 4,123,248 | 10/1978 | Drake | 71/4 |
| 4,279,101 | 7/1981 | Leroux | 47/64 |
| 4,334,908 | 6/1982 | Duchateau et al. | 71/52 |
| 4,337,078 | 6/1982 | Petrov et al. | 71/24 |
| 4,867,779 | 9/1989 | Meunier et al. | 71/62 |
| 4,972,627 | 11/1990 | Hori et al. | 47/64 |
| 5,030,267 | 7/1991 | Vinaty et al. | |
| 5,037,470 | 8/1991 | Matzen et al. | 71/52 |
| 5,102,440 | 4/1992 | Gallant et al. | |
| 5,225,342 | 7/1993 | Farrell | 435/240.45 |
| 5,301,466 | 4/1994 | Egan | |

OTHER PUBLICATIONS

Webster's II New Riverside Dictionary, p. 249, 1984.
Lynch, et al., Plant, Cell and Environment, 13:547-554 (1990).
Coltman, et al., J. Amer. Soc. Hort. Sci., 107(5):938-942 (1982).
Yeager, et al., HortScience, 21(2):262-263 (1986).
Yeager, et al., HortScience, 19(2):216-217 (1984).
Elliott, et al., Journal of Plant Nutr., 6(12):1043-1058 (1983).

*Primary Examiner*—Deborah Jones
*Assistant Examiner*—Amy M. Harding
*Attorney, Agent, or Firm*—Thomas J. Monahan

[57] ABSTRACT

A method for providing a P buffer fertilizer to plants growing in soilless media has been developed. Plants are provided with phosphorus (P) fixed to alumina (Al) in a concentration ranging from 0.25-16% by volume as a solid-phase P buffer for sustained release of P. The resulting plants show increased root growth and resistance to transplant stress. The invention has the further benefit that it virtually eliminate P leaching from the growing media. The fertilizer can be applied to containerized plants, crops, grass or other plants requiring P for growth. The invention is particular useful for greenhouse plants, vegetable and bedding transplants, stadium fields and golf courses where P leaching from the growing media is undesirable. The invention is particularly useful for transplants because it affords increased root growth which increases the probability of transplant success.

12 Claims, 12 Drawing Sheets

SOLID-PHASE P BUFFER FOR SUSTAINED LOW-LEACHING P FERTILIZATION OF PLANTS

TECHNICAL FIELD

The present invention relates to the fertilization of plants growing in soilless media. The media can contain peat, bark, vermiculite, perlite, sand, gravel or rock wool, or it can be a liquid/hydroponic system. The invention describes the use of phosphorus (P) fixed to alumina ($Al_2O_3$) as a solid-phase P buffer for sustained release of P from the Al thus providing P for plant growth with relatively little P leaching out of the media. The fertilizer can be applied to containerized plants, crops, grass or other plants requiring P for growth. The invention is particularly useful for greenhouse plants, ornamental propagation, mushroom cultivation media, vegetable and bedding transplants, and for turf used for stadium fields and golf courses where P leaching from the growing media is undesirable. The invention is also particularly useful for transplants because it affords increased root growth which increases the probability of transplant success.

BACKGROUND OF THE INVENTION

P is one of the essential mineral nutrients which are directly involved in plant metabolism and can not be replaced by other elements. In the absence of P, a given plant will not be able to finish its complete life cycle. P is one of the macronutrients which are required in higher amounts for an optimum plant growth.

The main driving force for P moving to the root surface is by diffusion. Diffusion occurs when ions move from a region of higher concentration to lower concentration. Diffusion through a short distance is much faster than through a long distance because the time required for a substance to diffuse a given distance is determined by the square of the distance. This suggests that the uptake of a certain nutrient by diffusion is strongly related to available ions close to the root surface. P is usually stabilized in soils and tends to be less mobile compared to other nutrients.

Al is not an essential element for plant growth. Most plant are sensitive to high Al concentrations. Al interferes with the uptake of P directly through the precipitation of alumina phosphate, because P is bound by strong P adsorption to clay minerals. Al is immobile in plant tissue, so it is seldom transported to shoots and the accumulation is mostly confined to the roots.

Soilless growing media are plant-growing substrates which do not contain traditional mineral or field soils. Some common materials for soilless media are peat, bark, vermiculite, sand, perlite, rock wool, etc. While any of these can be used, they are most commonly used in combination of two or more, especially when sand is included. In greenhouse production, sand is not used by itself but added with peat or other components for the purpose of improving bulk density and wetability of the mix. Sand by itself has a good drainage but low water retention. It has been used as a sand culture for nutritional experiments to establish whether a particular mineral element is essential. In general, soilless media have been gradually substituted for soils in the greenhouse crop production for decades. By the end of the 1980s, more than 90% of the U.S. greenhouse growers did not use soils for their growing media.

Soilless media have a poor ability of providing a reserve of nutrients. These media are unable to retain nutrients against loss by leaching and to provide the slow and steady release of nutrients over a long period which occurs with soil-based media (Bunt, A. C., Recent Developments in Soilless Media, SPAN, 26(1):12–14, 1983). Therefore, soilless media have a strong dependence on balanced ratios of available and constant supply of fertilizers. The consequence of unbalanced and inconstant nutrient supply is plants show nutrient starvation or deficient symptoms faster in soilless than in soil-based media.

Fox and Kamprath (Adsorption and Leaching of P in Acid Organic Soils and High Organic Sand, Proceedings of the Soil Science Soc. Of America 35:154–156, 1971) have reported that P, in particular, has a greater loss from soilless media than soils. Marconi and Nelson (Leaching of Applied Phosphorus in Container Media, Scientia Horticulturae 22:275–285, 1984) addressed that soilless media, such as peat moss-based or vermiculite-based mix, had a relatively low P adsorption capacity and allow a high percentage of P to leach from the media. Bunt (Physical and Chemical Characteristics of Loamless Pot-Plant Substrates and Their Relation to Plant Growth, Acta Horticulturae 37:1954–1965, 1974) used two different mixes of media and examined their nutrient leaching. Peat-vermiculite (1:1) mix has a much reduced P-leaching than peat-sand (3:1) mix, 43% comparing to 60%.

Since P is available in a form of anions, $HPO_4^{-2}$ or $H_2PO_4^-$, Yeager, T. H., and Barrett, J. E. (Phosphorus Leaching from $^{32}$P-superphosphate-amended Soilless Container Media, Hon. Science 19 (2): 216–217, 1984) have amended the soilless media with an anion exchange resin to reduce P leaching. P leached through the resin amended media (48 kg/m$^3$) is reduced to 61% comparing to the untreated media, 80%. However, this result was not economically feasible if applied commercially, because to achieve this effect, it cost $25.6 per 3 liter container to apply such amount of resin.

One of the major differences between soil and soilless media is that soilless media do not contain adequate quantities of Fe and Al commonly found in mineral soils (Fox and Kamprath, 1971). In the field condition, Fe and Al adsorb P and form insoluble Fe and Al phosphates, so P is stabilized in the media by this fixation. The solubility of Fe and Al phosphate can be increased for P uptake by decreasing media pH or through the organic acids such as citric and malic acids in root exudates around the rhizosphere.

The P fixation by Al was confirmed by Yeager and Barrett (Influence of an aluminum amendment on phosporus leaching from a container medium, Hort. Science, 21(2):262–263, 1986) who have determined that an amendment of Al (1200 g/m$^3$ of aluminum acetate, 13.2% Al) in soilless media significantly reduced P leaching to 0.3%; whereas the media without being amended with Al has 80% of P leached. However, the application of soluble Al may not be practical, because of the potential toxicity of soluble Al on plant growth. There was no plant material involved in the reported study so the influence on plant growth was not determined.

The solid-phase P-$Al_2O_3$ was originally invented for the P nutrition study in a sand culture system. The purpose of using P-$Al_2O_3$ was to simulate a P deficient environment as is often seen under field conditions. In the traditional P-study experiments, P was applied at the beginning of the growth and depleted towards the end of the season. Also in the agitated solution culture system, both P concentration and P mobility are high. Whereas in the field, plants are in an environment with a rate-limiting supply of P. This is mainly due to the limited P source in soils, which adsorb P on sites of soil particles and at a later time that P may be released back to the soil solution.

Coltman, R. R., Gedoff, G. C., and Gabelman, W. H. (A Sand Culture System for Simulating Plant Responses to Phosphorus in Soil, Journal of the American Society for Horticultural Science, 107(5):938–942, 1982) first developed the sand-alumina culture system with P supplied from the P-adsorbed alumina, which was obtained from the activated alumina loaded with phosphate ($KH_2PO_4$). This sand-alumina culture technique showed promise for simulating plant responses to P deficient conditions.

The P concentration desorbed from sand-alumina were dependent on the P concentration loaded on the Al, and after the stability of solution P concentration in the culture has been reached, increasing the density of P-loaded Al in sand had no effect on the average culture P concentration. Thus, diffusion, the rate-limiting step in absorption of P from soil, appears to be rate-limiting in sand-Al system as well (Coltman et al., 1982).

Many horticultural operations rely upon container plants for part or all of their production cycle, including vegetable transplants, nursery ornamentals, bedding plants, greenhouse vegetable production, and greenhouse floriculture production. The overwhelming majority of container plants are grown in artificial substrates such as perlite, vermiculite, peat, and mixtures thereof. While synthetic substrates have generally good water holding characteristics, cleanliness, and convenience, they share an inability to retain and release plant nutrients, unlike natural soils. Crop requirements for specific nutrients change during the growing season, are affected by environmental conditions, genotype, etc., and are difficult to continuously monitor. Consequently, container crops are supplied with high levels of fertilizer throughout their growth cycle. This results in higher production costs, runoff of excess nutrients, and can lead to suboptimal plant performance because of salt damage and the deleterious effects of excessive nutrient concentrations. In the case of P, the high concentrations used in horticultural production have been shown to inhibit root growth, increase plant susceptibility to salt stress, disrupt flowering and fruiting processes, and interfere with the utilization of other nutrients such as Zn and Ca. The present method reduces these problems.

Additionally, fertilizer runoff is of increasing concern in horticulture operations. In the United States fifty percent of the total population and ninety percent of the rural population are dependent upon groundwater for their drinking water. Intensive agricultural production, typified by most horticultural activities, and most especially greenhouse and nursery container production, has been largely overlooked as point sources of pollution. Very recently, however, the public has begun to focus on the greenhouse and nursery industries not only as high volume water users, but also as potential sources of groundwater contamination. Nurseries and greenhouses use large volumes of fertilizer-charged irrigation water. These industries are now concerned that they may be viewed as serious point-source groundwater polluters. It is estimated that container-grown nursery and floriculture crops require 750 to 1500 cubic meters of water per acre per day. When standard methods of overhead irrigation are used, about 80 percent of this fertilized solution falls between the pots, or is leached out the bottom of the pots, where it may pollute groundwater and surface water resources (Tilt, K., Tennessee Nursery Digest 10(1):1–2, 1988.)

Another problem in the industry is that many container plants are exposed to environmental stresses after the production cycle, as they are shipped, handled, and stored for retail sale, or in the case of transplants, as they withstand the stress of 'transplant shock' in the field or garden; The improved root growth generated by optimal P nutrition would help plants withstand drought stress, heat stress, and would help transplant establishment in soil.

Losses in plant quality resulting from postproduction stresses can substantially impact grower profits and consumer satisfaction. Bedding plants, in particular often suffer severe stress during shipping and marketing. The container volume is typically very small relative to the size of the shoot, and retail outlets frequently display the plants in unprotected areas, where sun and wind can cause high transpiration rates. Consequently, the media dries out, and plants may wilt repeatedly before being transplanted. This stress can considerably reduce the quality of the plants at the time of sale, and the ability of the plants to quickly establish themselves after transplanting. Growers of high quality plants "harden off" plants with cooler night temperatures and reduced water and fertilizer during the final weeks of production (Armitage, A. M. Bedding Plants: Prolonging Shelp Performance—Postproduction Care and Handling, Ball Publishing, Batavia, Ill. 71pp, 1993). These practices reduce the growth and transpiration rate of the shoot and encourage root proliferation, which improves stress tolerance. One of the difficulties with this practice is that little is known about plant responses to particular regimes, particularly fertilizer reductions. Too little fertilizer will delay flowering and slow growth even after transplanting. The present method will encourage root proliferation throughout the production cycle, eliminating or reducing the requirement for a special treatment at the end of production.

Potted flowering plants, such as poinsettia, also suffer from postproduction stress. Plants are first sleeved and held in a dark box, where the humidity is high, then removed and placed in a low-humidity, low light retail environment, very different from the production environment. The fluctuations in water demand and likelihood of sporadic watering lead to frequent drought stress. Providing a constant low P supply throughout production would encourage root proliferation and make the plant more tolerant of postproduction water stress.

Successful production of field vegetables is based on the ability of the grower to establish either seed or transplants as quickly as possible in the field. Rapid establishment of the crop is important because the plant can then withstand environmental stresses, reduce time to maturity, and generally produce optimum crop yield and quality. Re-establishment of the transplant or rapid, uniform germination of seeds is predicated on the assumption that optimum levels of P are in the soil and enhancing root growth of the transplant or germinated seedling. Pre-transplant root proliferation provided by the method of the present invention should improve the production of transplanted field vegetables.

Poinsettias, potted chrysanthemums, and other products that are retained in their containers by the home consumer would also benefit from a vigorous root system, since consumers may not have the expertise to properly irrigate and fertilize their plants. Growing these plants in a $P-Al_2O_3$ amended media would make them more resistant to poor irrigation and would also eliminate the necessity for the consumer to apply any P fertilizer.

SUMMARY OF THE INVENTION

The high levels of P fertilizer used in existing container plant production may be detrimental to crop vigor by reducing root growth, interfering with other nutrients such as Zn and Ca, inhibiting flowering, and by increasing susceptibility to salinity damage, blossom end rot, and other stresses encountered by container plants. The present invention reduces these problems by providing a solid-phase P buffer for sustained, low-leaching P fertilization of plants.

A fertilizer technology that provides continuous, optimal levels of P to plant roots based on actual plant requirements, while minimizing leaching of P from the growing media has been developed. The technology maintains or improves crop performance while minimizing P leaching and the need for P fertilization. This technology can also improve postproduction stress tolerance by improving root growth and plant vigor.

The present invention provides P concentrations to plants that are approximately one thousand times less than those provided by conventional nutrient solutions, yet because this level is continuously maintained, the plants receive adequate P nutrition. The lower concentrations of P provided by the new technology are within the range encountered in fertile soil, to which plants are adapted by evolution. The method of the present invention helps eliminate problems caused by excessive P fertilization and generates more vigorous, healthy, and attractive plants.

The invention is based on reversible binding of P to solid alumina in such a manner that P will be bound to the solid alumina, then the solid $P-Al_2O_3$ can be added to soilless growing media in amounts sufficient to provide proper plant growth and nutrition. When the growing media is used, the plant will take up the P that is available so that additional P will be released. It should be noted that the driving force for the release of P from the alumina is P uptake by the plant. This mechanism will permit normal plant growth with low levels of P in the medium solution. Since there are low levels of P in solution there will be much less leaching of P than there would if P was added at each irrigation. This invention is different from existing slow release fertilizers in the mode by which the P is released.

Applicant's method is useful for improving plant tolerance to postproduction stress by improving root vigor. By understanding the communication between root and shoot during challenging conditions in the rhizosphere, and the changes in root architecture and morphology such a change will cause, will enable us to prepare the rhizosphere in a way that permits maximum growth and development of the root system to improve plant tolerance to stress factors. To increase consumer satisfaction, growers must produce compact high-quality plants that are free from diseases and are stress tolerant. Plants with well-developed root systems that exploit the medium uniformly and with room for further growth, can best withstand the fluctuations in soil moisture that occur during shipping and handling and even in the hands of the consumers. Such plants will also resume growth more rapidly in the garden or landscape, leading to better performance.

To keep the production period as short as possible, high light, high temperature and plenty of fertilizer is often applied to the plants to maximize growth rate. However, these conditions tend to produce plants with elongated, lush shoots, poorly developed roots and poor stress tolerance. Therefore, it is recommended that growers harden (or tone or acclimate) their plants with a short period of lower temperature and reduced fertilizer and water at the end of the production cycle. This practice encourages root growth at the expense of shoot growth and increases the resistance of the plant to stress. While this is helpful, it might be possible to improve plant quality and stress tolerance even more by encouraging strong root growth during production by adjusting the P levels in the root zone. This will arrest the shoot growth while the roots continue elongation in search of areas with a higher P content. Thus, it has been observed that bean roots are thinner and longer under low P conditions. The high P levels (1–2 mM P) commonly used in commercial horticulture probably inhibit root elongation. As part of the present invention, we use P buffered solutions to show that plants can grow well on P concentrations significantly below 1000 µM.

The present invention is a method of fertilization using a soilless growing containing a P charged alumina in amounts sufficient to provide proper plant growth and nutrition. The $P-Al_2O_3$ is used in amounts greater than 0.25% by volume of the growing media. The amount is preferably 0.5–16.0% by volume and more preferably 1–8% by volume. These amounts are intended to provide the media with a P concentration that is greater than 27 µM, preferably greater than 30 µM and less than 1000 µM, and most preferably greater than 50 µM and less than 250 µM. The invention also relates to a fertilization method comprising running water through a cartridge containing $P-Al_2O_3$ to provide a solution contain P in amounts sufficient to provide proper plant growth and nutrition. It is understood that the term 'soilless media' is not meant to exclude media with minor amounts of soil. It is preferred that the soilless medium contains predominately soilless components and it is most preferred that substantially all of the growing medium is soilless components. It is preferred that the medium contains at least 5%, more preferably at least 15%, still more preferably at least 30%, and most preferably at least 50% non-sand components.

The $P-Al_2O_3$ is made by a process comprising: (a) rinsing dry alumina with distilled water, (b) treating the rinsed $Al_2O_3$ with HCl for a time sufficient to activated the surface, (c) rinsing the alumina again, (d) adjusting the pH to about 3–7, preferably about 5–5.5, (e) contacting the alumina with $KH_2PO_4$ at a concentration and for a time sufficient to bind the desired level of phosphorus onto the alumina, and (f) drying the $P-Al_2O_3$. The amount of phosphorus charged onto the alumina is not particularly limited by applicant's fertilization method, but is generally in the range of 1–150,000 ppm. The amount of P bound to the alumina is preferably about 3–1000 ppm and most preferably 5–16 ppm.

OBJECTS OF THE INVENTION

It is an objective of the present invention to provide a P charged Al fertilizer that will release enough P so that plant growth is equal to or better than traditional liquid fertilizer.

It is also an objective of the present invention to provide a fertilizer for growing media, particularly soilless media, such that the P lost in the leachate is reduced compared to the P lost in the leachate of traditional fertilization methods.

It is further an objective of this invention to provide a fertilizer containing P charged Al, which can be applied to crops, greenhouse plants, ornamental plants, mushroom cultivation media, vegetable and bedding transplants, turf for stadium fields and golf courses, and other plant growing media where P runoff is undesirable.

It is also an objective to provide a P charged Al fertilizer such that the release of P be over an extended period of time at a lower level of P in the media in order to encourage better plant growth than with high levels of P in the growing media.

It is also an objective to improve plant growth and vigor through optimal nutrition.

It is also an objective to improve crop tolerance to postproduction stress by improving root vigor.

DETAILED DESCRIPTION

Figure 1:
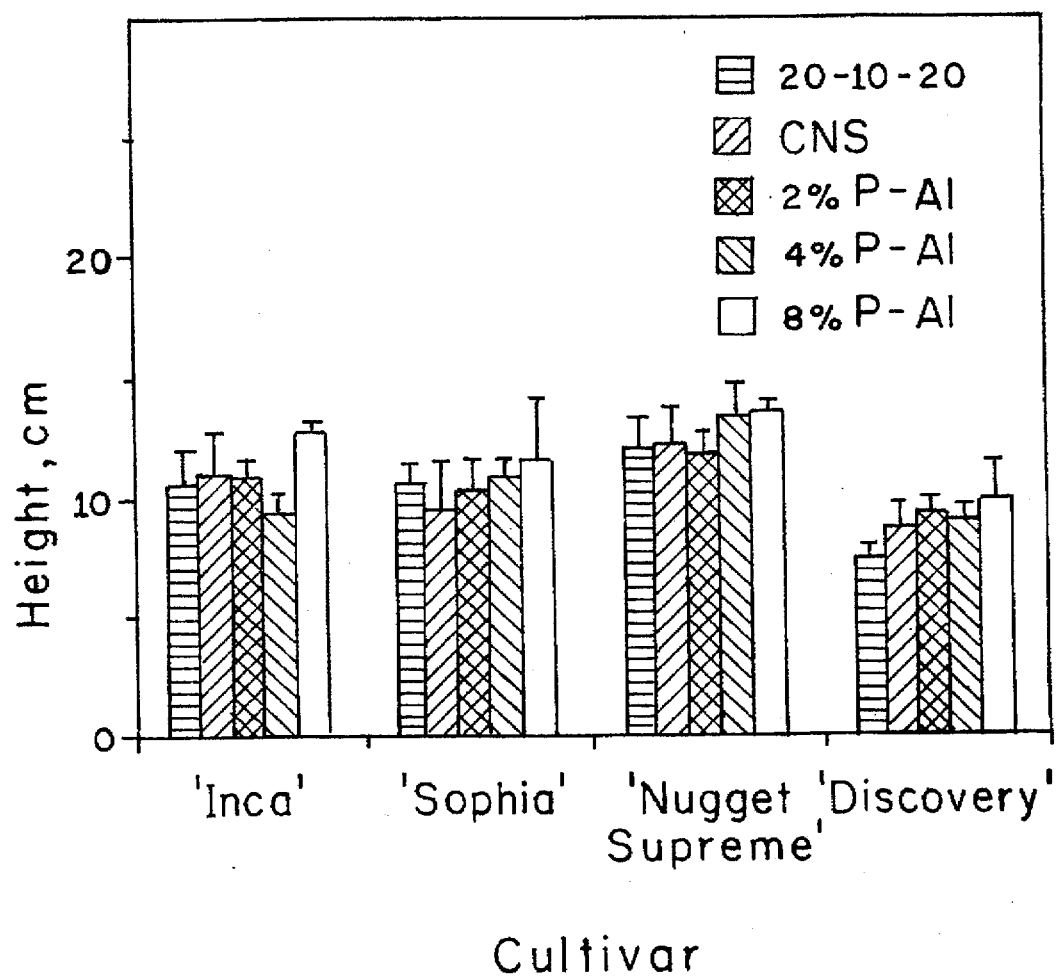
FIG. 1 shows a bar chart comparing shoot height of 4 week old marigolds grown in media fertilized with different sources of P.

The problems described above have been addressed by the use of a solid alumina compound as a buffered P fertilizer. The alumina is treated with P then added to the growing media in very low concentrations—our work with peatlite soilless mixes indicates that 1 to 2% of the volume of the dry media is sufficient for optimal plant performance of floriculture crops. The P bound to the solid alumina releases a very low concentration of P into the surrounding solution, in the range of concentrations encountered in natural soils, and about one thousand times lower than conventional horticultural nutrient solutions. Because soluble P concentrations are very low, even if large quantities of water are flushed through the media, negligible amounts of P are lost. Although the solid alumina releases very low concentrations of P, it acts as a buffer; that is it will tend to maintain that concentration under any condition. It establishes an exchange equilibrium. This means that as the plant roots absorb P from the media solution, the alumina will spontaneously release more P into solution. In this way the release of P from the fertilizer is exactly proportional to the P requirement of the crop. If because of growth stage or environmental conditions, the plant is growing slowly or P requirement is reduced, less P is released from the solid alumina. As the plant grows and its P requirement increases, the amount of P released from the solid alumina increases accordingly. In this way the alumina can be used to provide optimal P nutrition over time, without the need for grower monitoring, and without the need for any additional P fertilization, while minimizing P leaching from the container.

As a means for providing the P charged alumina to the plants, it can simply be mixed with soilless media prior to planting or it can be employed by packing into cartridges to buffer recirculating nutrient solutions in hydroponic systems. The latter may be especially useful in systems employing rockwool or other types of soilless media that may be difficult to mix with an alumina additive. In either treatment method, the P-$Al_2O_3$ is supplied in an amount sufficient to provide the plant with optimal growth and nutrition.

The following examples are representative of Applicant's invention and not meant to unduly limit the scope of the invention. The examples are drawn to specific containerized plants in a soilless media since P runoff is of particular concern in this type of application. However, Applicant's invention is applicable to any growing media where it is desirable to provide a slow release P containing fertilizer or where P runoff is a concern.

Procedure of Charging Phosphorus onto Alumina

Alumina (Alcoa, Grade F1, 28–48 mesh, 92.1% $Al_2O_3$, 0.72% $SiO_2$) was loaded in a PVC column which had a circulated inlet and outlet to a 100 liter tank. Dry alumina was first rinsed with distilled water until the circulated water came out clear. Then the rinsed $Al_2O_3$ was treated with 0.05N HCl for 24 hours to activate the charging surface of $Al_2O_3$. After treated with acid, $Al_2O_3$ was circulated with 100 liters of fresh distilled water every 3 hours for 3 times. Final pH in the circulating solution after 3 times of water rinsing was around 3.5. To standardize $Al_2O_3$ surface charging effects on P binding and releasing, the acid-treated $Al_2O_3$ was adjusted to obtain an equilibrium pH of 5 to 5.5. by adding 0.5N KOH or HCl.

Acid-treated and adjusted $Al_2O_3$ was then circulated with 10 mM $KH_2PO_4$ loading solution for 72 hours. After 72 hours of charging procedure, the $Al_2O_3$ was downloaded from the PVC column and dried in the oven at 49°±1° C. for two days. Dried $Al_2O_3$ was stored in a dark and dry area and ready to be used.

EXAMPLE 1

One hundred marigold seeds of four cultivars, 'Discovery' (*Tagetes erecta*), 'Inca' (*T. erecta*), 'Sophia' (*T. patula*), and 'Nugget Supreme' (*T. erecta x T. patula*) were germinated. Forty uniform seedlings per cultivar were chosen and transplanted one to each four inch square pot and grown in the greenhouse. Potting medium was a mix of peat moss, vermiculite, and sand (SNOW WHITE) at 2:2:1 ratio by volume. P-$Al_2O_3$ amended media had the same soilless components except the different volume of P-$Al_2O_3$ (2%, 4%, and 8%) was substituted for an equal amount of sand. Depending on different treatments, plants grown in soilless media were fertigated with 20-10-20 (PEATLITE, PETERS PROFESSIONAL) or complete nutrient solution (CNS). The P-$Al_2O_3$ amended media was fertilized with the complete nutrient solution minus P nutrient (MPS).

The complete nutrient solution was composed of the following (in μM): 1500 $KNO_3$, 1200 $Ca(NO_3)_2$, 400 $NH_4NO_3$, 25 $MgCl_2$, 5 FeEDTA, 500 $MgSO_4$, 300 $K_2SO_4$, 300 $(NH_4)_2SO_4$, 1.5 $MnSO_4$, 1.5 $ZnSO_4$, 0.5 $CuSO_4$, 0.143 $(NH_4)_6MO_7O_{24}$, 0.5 $Na_2B_4O_7$ and 15 $KH_2PO_4$. The nutrient solution was prepared from three stock solution (Table 1) Media amended with P-$Al_2O_3$ were applied with the complete nutrient solution minus P solution. Hence, it (MPS) only contained the first and second stock solutions. Each stock solution was diluted 1000 times before use. Table 1 lists the nutrient components and concentrations in the three undiluted stock solutions.

TABLE 1

| | Stock Concentration (M) |
|---|---|
| Stock Solution 1 | |
| $KNO_3$ | 1.5 |
| $Ca(NO_3)_2$ | 1.2 |
| $NH_4NO_3$ | 0.4 |
| $MgCl_2$ | 0.025 |
| FeEDTA | 5 (mM) |
| Stock Solution 2 | |
| $MgSO_4$ | 0.5 |
| $K_2SO_4$ | 0.3 |
| $(NH_4)_2SO_4$ | 0.3 |
| $MnSO_4$ | 1.5 (mM) |
| $ZnSO_4$ | 1.5 (mM) |
| $CuSO_4$ | 0.5 (mM) |
| $(NH_4)_6Mo_7O_{24}$ | 0.143 (mM) |
| $Na_2B_4O_7$ | 1 (mM) |
| Stock solution 3 | |
| $KH_2PO_4$ | 15 (mM) |

Fertilizer or nutrients were fertigated (fertilized and irrigated) through trickle irrigation. The frequency of fertigation was dependent on plant size and environmental conditions and ranged from daily to once every three days. Leachate was collected once every week for P analysis. A leachate collecting bowl was placed underneath each pot. Leachate was sampled when the collecting bowl was full. Flowering date was taken when the petal of the first flower showed coloration. Buds longer than one centimeter were counted. Branches were counted when they were more than two centimeters in length.

At four weeks after transplanting, four random blocks were harvested for measuring shoot fresh and dry weights. Shots were cut off at soil line, weighed, then dipped in diluted P-free detergent and rinsed with distilled water a few times to wash off undesirable substances on shoots. Washed plants were then put into brown paper bags and dried in an oven at 49°±1° C. for three days. The other four blocks of plants were harvested eight weeks after transplanting and the same harvesting procedure was followed.

Results at Four Weeks

During four weeks of plant growth, cultivars 'Sophia', 'Nugget Supreme', and 'Discovery' did not show any differences in general appearance and foliage coloration among all treatments. In cultivar 'Inca', however, the CNS and P-$Al_2O_3$ treated plants which were fertilized with nutrient solution showed a slight yellow coloration on foliage and whole plant part compared to the 20-10-20 fertilized plants. Nitrogen deficiency was the probable cause of the chlorosis on 'Inca' plants, which seemed to require higher levels of nutrients than the other three cultivars. The poor growth on nutrient solution fertilized 'Inca' may be caused by the different elemental compositions between nutrient solution and 20-10-20 fertilizer (Table 2).

TABLE 2

| Element | 20-10-20 (mg/l) | CNS (mg/l) | MPS (mg/l) |
|---|---|---|---|
| N | 100 | 74 | 74 |
| P | 22 | 12.4 | — |
| K | 83 | 99 | 82 |
| Ca | — | 48 | 48 |
| Mg | 0.75 | 12.76 | 12.76 |
| Mn | 0.28 | 0.08 | 0.08 |
| Fe | 0.50 | 0.28 | 0.28 |
| Cu | 0.05 | 0.03 | 0.03 |
| B | 0.10 | 0.005 | 0.005 |
| Mo | 0.05 | 0.01 | 0.01 |

'Inca' plants did not grow well with the nutrient solution. However, P-$Al_2O_3$ treated plants did not show symptoms of P deficiency, which typically shows a reduced height and greener coloration from the stunted growth. After four weeks of growth, the 8% P-$Al_2O_3$ treatment even produced plants with taller height, more branches, and heavier shoot weight than the control treatments (FIGS. 1–4). Phosphorus-charged alumina treatments produced 'Sophia' and 'Nugget Supreme' plants with the same height as CNS and.20-10-20 treatments (FIG. 1). The CNS and P-$Al_2O_3$ fertilized 'Discovery' plants were generally taller than 20-10-20 fertilized plants. This was possibly because 'Discovery' plants grew better with nutrient solution than with 20-10-20.

Figure 2:
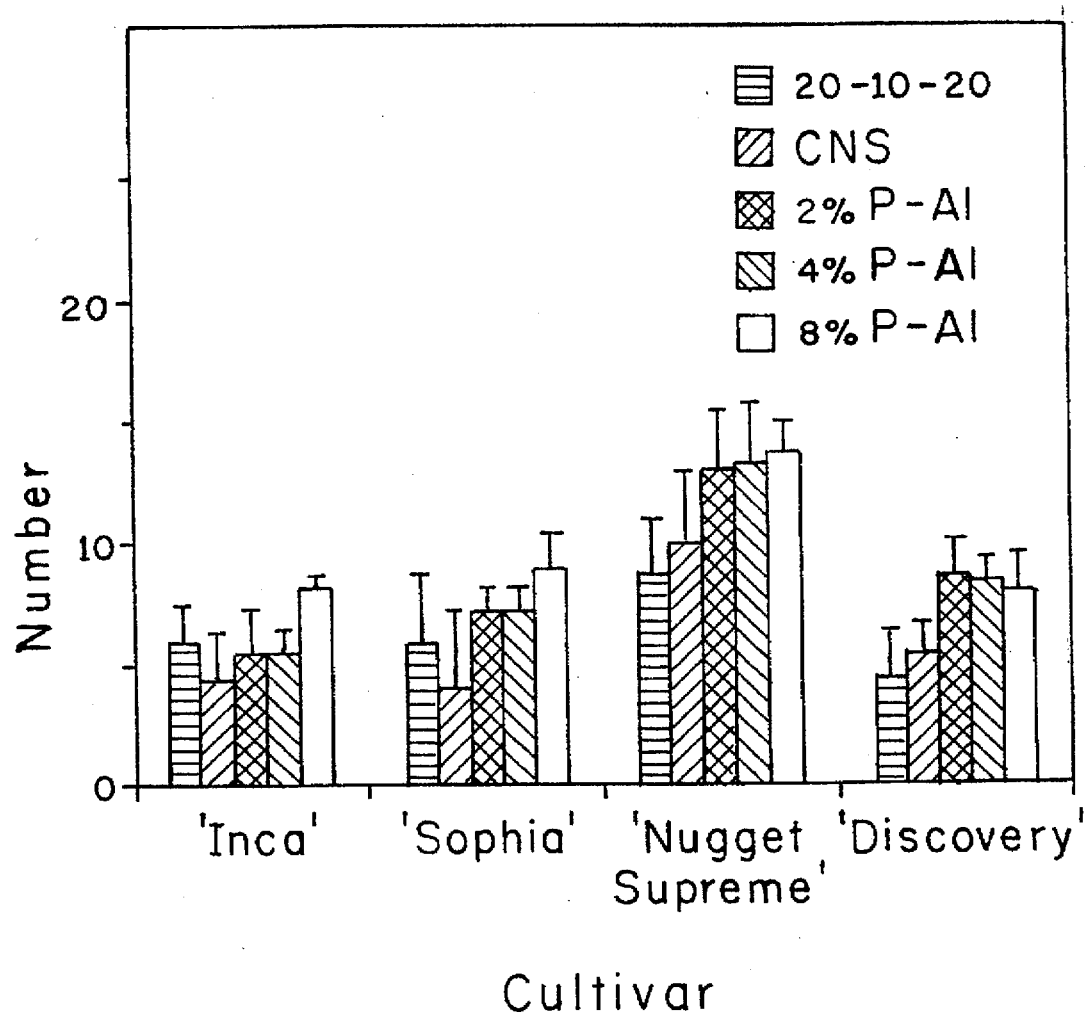
FIG. 2 shows a bar chart comparing number of branches produced by 4 week old marigolds grown in media fertilized with different sources of P.
Figure 3:
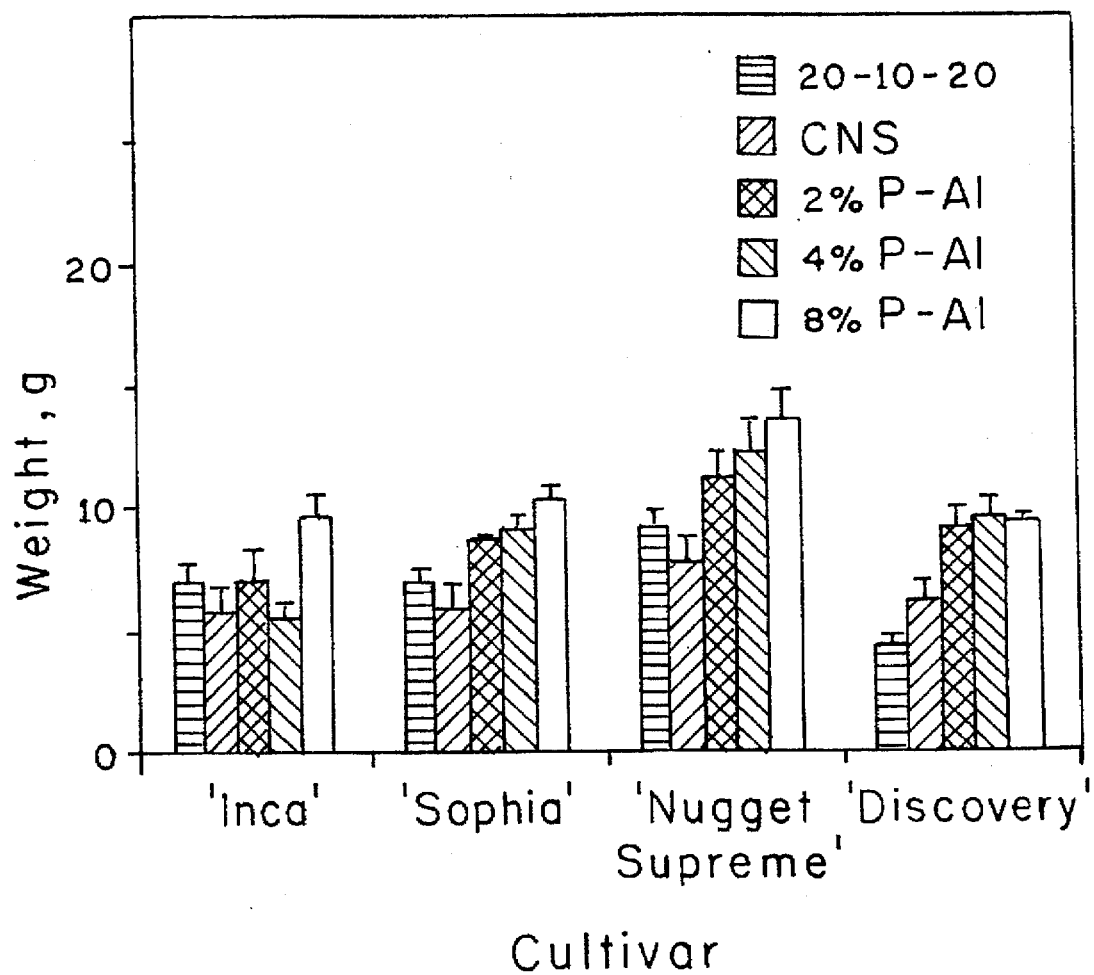
FIG. 3 shows a bar chart comparing shoot fresh weight of 4 week old marigolds grown in media fertilized with different sources of P.
Figure 4:
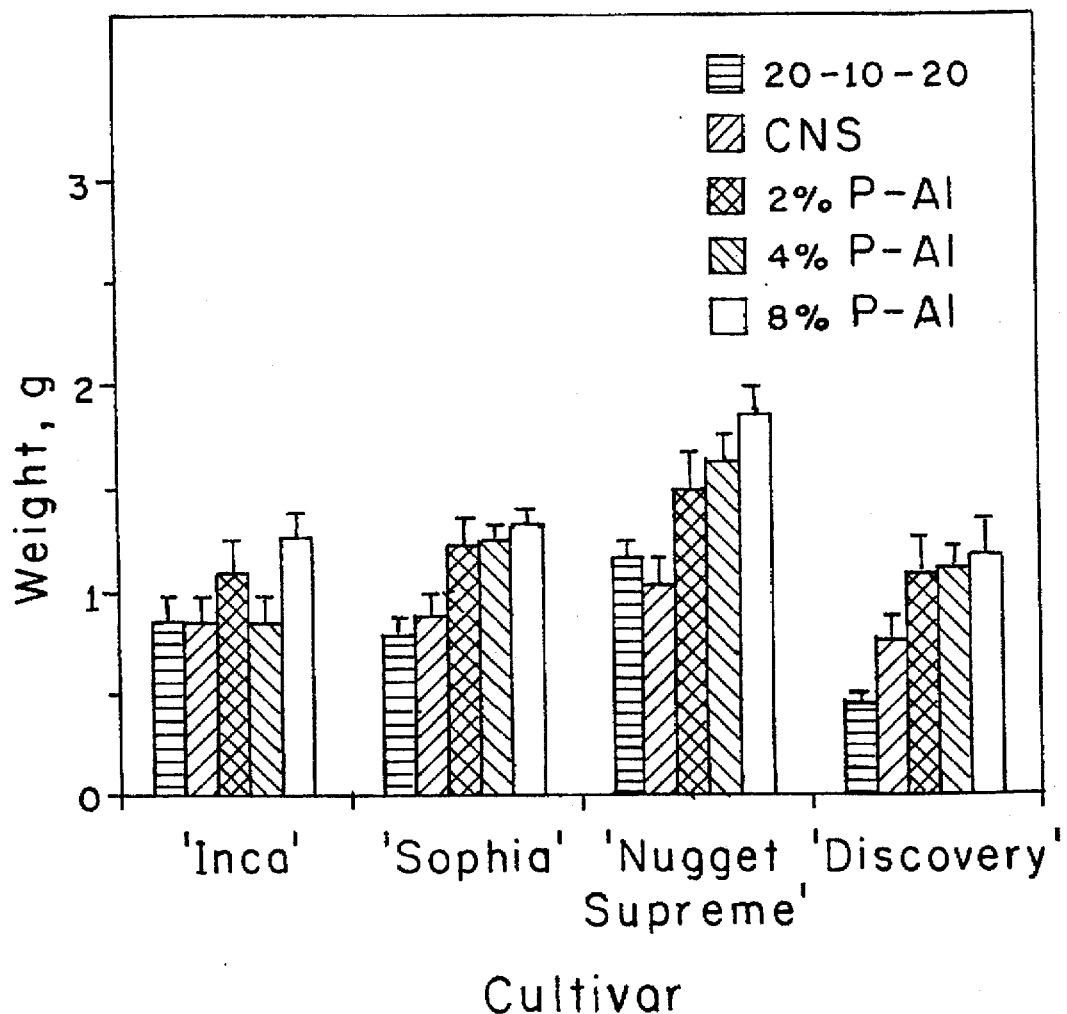
FIG. 4 shows a bar chart comparing shoot dry weight of 4 week old marigolds grown in media fertilized with different sources of P.

'Sophia', 'Nugget Supreme', and 'Discovery' reacted similarly to P-$Al_2O_3$ in number of branches, shoot fresh weight, and dry weight (FIGS. 2–4). The P-$Al_2O_3$ treatments produced plants that had more branches and heavier weight than plants grown with CNS or 20-10-20 fertilizer. Phosphorus-charged alumina treated plants had no difference on flowering date, number of flowers, buds, or flowers plus buds compared to the control plants. In general the P-$Al_2O_3$ amended media produced plants that were consistently better than or as good as the traditional fertilization treatments.

Results at Eight Weeks

Overall, the shoots in P-$Al_2O_3$ treatments were as healthy as the control groups for 'Sophia', 'Nugget Supreme', and 'Discovery'. The nutrient solution fertilized CNS and P-$Al_2O_3$ treated 'Inca' plants were generally more chlorotic on the whole plant and had thinner stems after eight weeks of growth than 20-10-20 fertilized plants.

Figure 5:
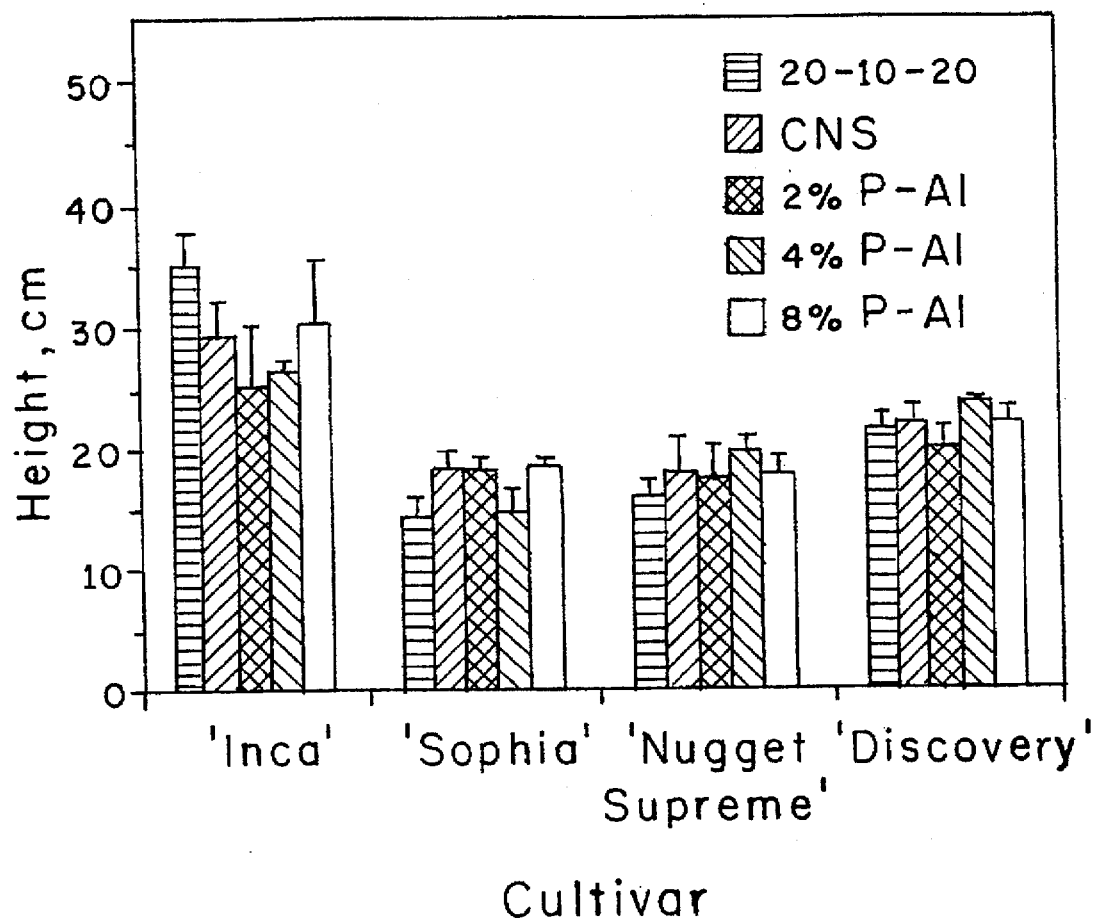
FIG. 5 shows a bar chart comparing shoot height of 8 week old marigolds grown in media fertilized with different sources of P.
Figure 6:
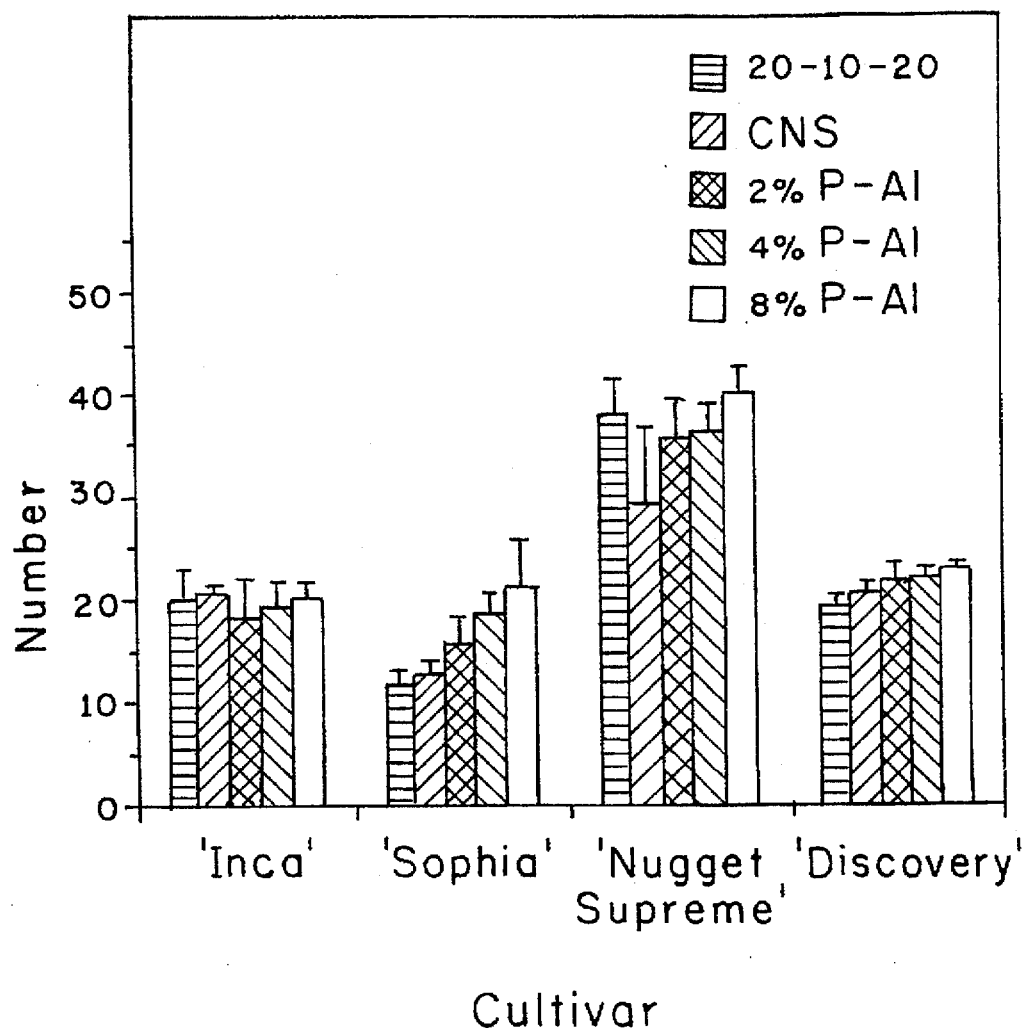
FIG. 6 shows a bar chart comparing number of branches produced by 8 week old marigolds grown in media fertilized with different sources of P.
Figure 7:
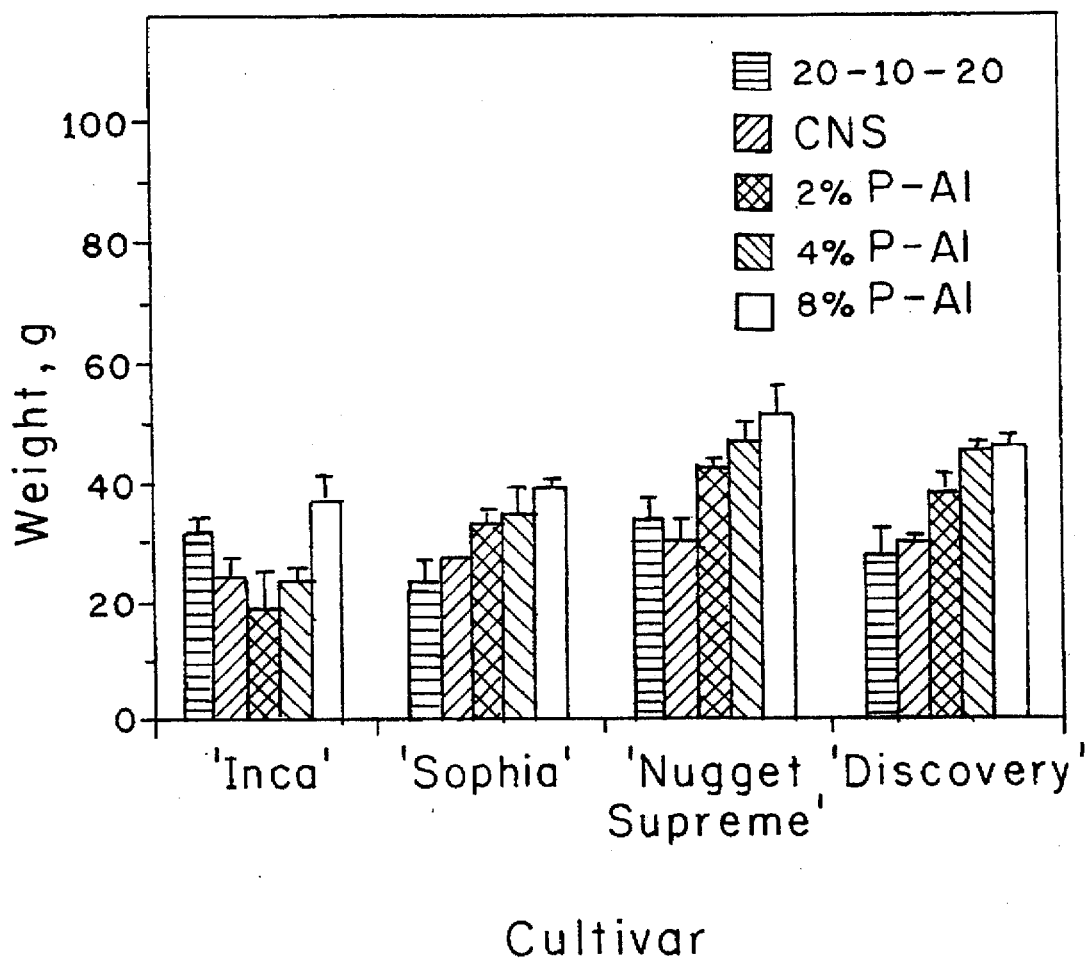
FIG. 7 shows a bar chart comparing shoot fresh weight of 8 week old marigolds grown in media fertilized with different sources of P.
Figure 8:
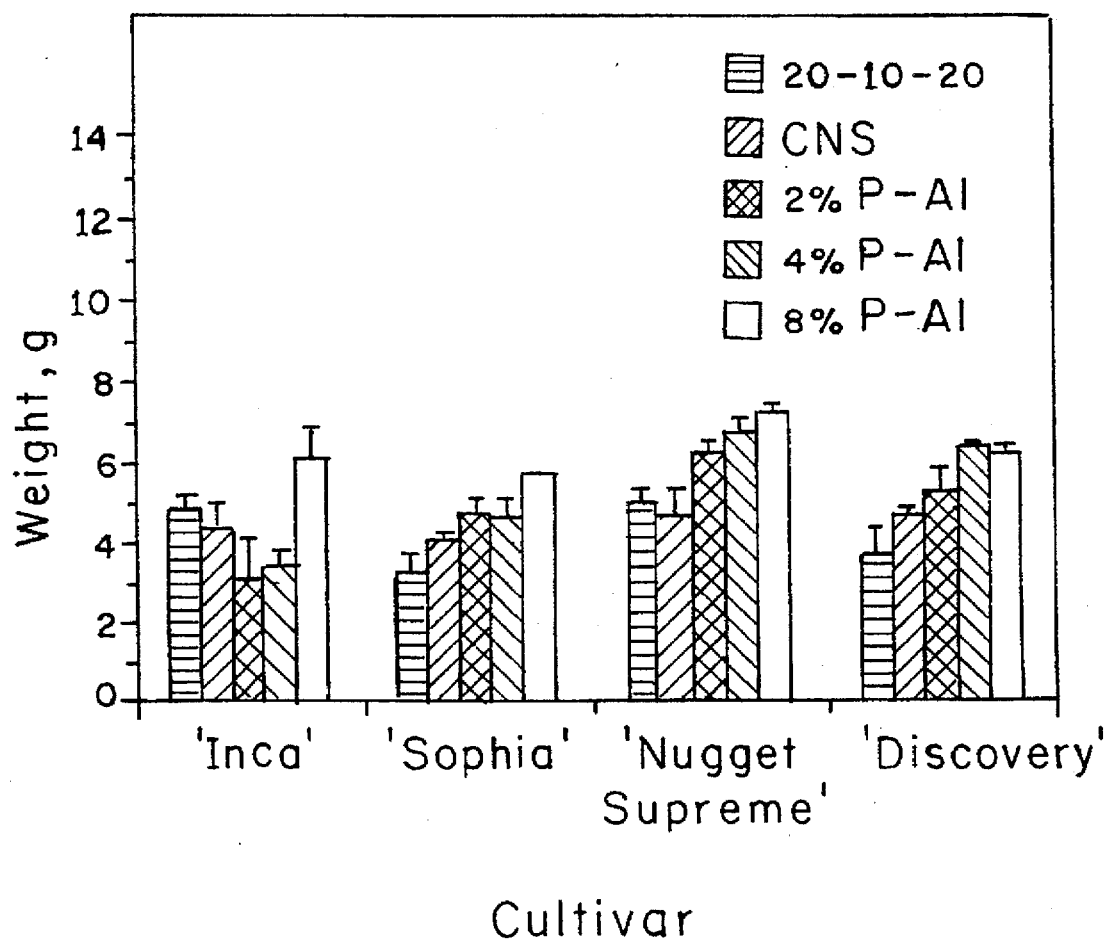
FIG. 8 shows a bar chart comparing shoot dry weight of 8 week old marigolds grown in media fertilized with different sources of P.

Eight-week-old marigolds grown in P-$Al_2O_3$ amended media showed no difference in plant height from the commercially grown plants (FIG. 5). Days to flowering was not affected by fertilization treatment. By the eighth week, plants in all treatments had similar number of flowers and buds. The P-$Al_2O_3$ treatments also had more fresh weight than the control plants (FIG. 7). Among the P-$Al_2O_3$ treatments plants in the 8% treatment had more branches and were heavier than plants in the 2% treatment. Plants in the 4% treatment did not always respond between the 2% and 8%, but rather were similar to one or the other.

Leachate Results

Figure 9:
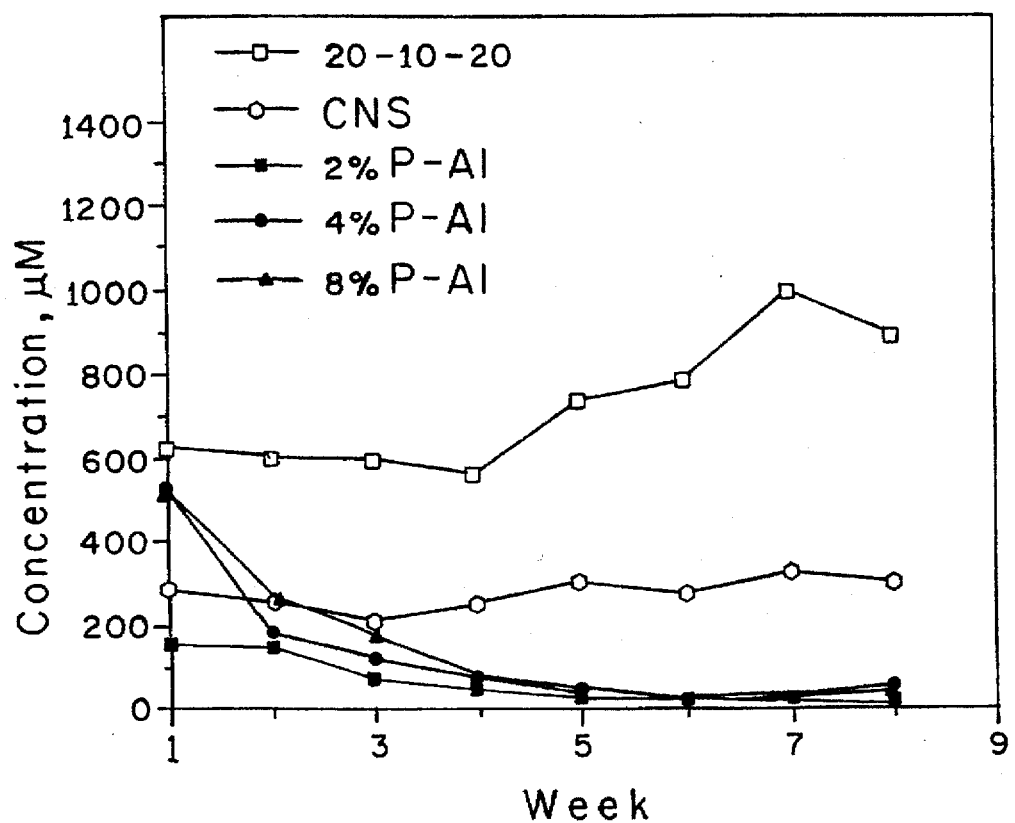
FIG. 9 is a line chart showing the loss of P to leaching from the 5 P treatments for 'Nugget Supreme'.

P run-off from 20-10-20 treatment had the highest concentration compared to other treatments (FIG. 9). This was caused by the high P content in 20-10-20 and the poor P holding ability of soilless media. The increasing P concentration during the last four weeks was probably because of a more frequent irrigation due to the larger size of the plants. Generally, the P run-off from 20-10-20 treatment ranged from 600 µM to 1000 µM throughout eight weeks of growth. P run-off from the solution treatment was much less than 20-10-20 because of the reduced amount of P contained in the nutrient solution. Solution treatment also had a fairly constant P concentration in the leachate and had an increased concentration towards later growing stages. Solution treatment had a range of 200 to 400 µM of P concentration in the leachate across all cultivars. If the 20-10-20 treatment had a similar trend of P run-off at the later weeks of the solution treatment, the run-off from 20-10-20 was about twice as much as that from the solution. P run-off from the P-Al$_2$O$_3$ treatments was reduced compared to that from the control groups (FIG. 9). At fours weeks, higher amounts of P-Al$_2$O$_3$ had more P leached out than where lower amounts of P-Al$_2$O$_3$ had been used. The P concentration during the first four weeks declined from 500 µM at week one to 50 µM at week five. After week five, the P concentration was slowly declining, and during this period the P run-off did not differ regardless of the P-Al$_2$O$_3$ treatment.

This example clearly demonstrates one of our objectives, that P-Al$_2$O$_3$ fertilization can produce improved or similar plant growth and nutrition when compared to traditional fertilization methods while drastically reducing problems with P leaching.

EXAMPLE 2

The preparation of potting media was the same as in the previous example except that P-Al$_2$O$_3$ treatments were amended with 1, 2, 4, 8, 12, and 16% by volume of P-Al$_2$O$_3$. One hundred seeds of marigold cultivar 'Nugget Supreme' were sown and were transplanted on October 25. Germination and transplant procedures were as described in Example 1. After seedlings were transplanted to flats, they were placed in a growth room with a temperature of 22°±2° C. and 16 hours of irradiance at 190±30 micromoles*m$^{-2}$*sec$^{-1}$.

The complete nutrient solution was composed of three stocks as described in example 1 except that concentrations of both CuSO$_4$ and Na$_2$B$_4$O$_7$ were increased from 0.5 µM to 1 µM. Other elemental components remained the same as in Table 1.

On November 1, plants were transplanted to four-inch round pots. A leachate collecting bottle was attached and sealed underneath each pot. A total of 6.25 liters of fertilizer solution was applied to each pot in five weeks. The leachate was collected continuously throughout the growing period. The leachate was analyzed three times after 2.08 liters of solution had been applied. Plants were grown in the growth room at 22° C. and 16 hours of a combination of fluorescent and incandescent light with an irradiance level of 210 micromoles*m$^{-2}$*sec$^{-1}$. Potted plants were grown for 5 weeks and harvested December 9.

Results

During five weeks of growth, all of the plants grown in the P-Al$_2$O$_3$ amended media did not show any visual differences in growth compared to the plants grown with 20-10-20 or the complete nutrient solution.

Plant height after five weeks of growth was not different among experimental and control plants (Table 3). Number of branches on plants in the 20-10-20 treatment were lower than plants in all P-Al$_2$O$_3$ treatments except 2%. There was no relationship between percent P-Al$_2$O$_3$ and the number of branches on the marigold. P-Al$_2$O$_3$ treated plants were heavier than those fertilized with 20-10-20 and the complete nutrient solution in both fresh and dry weight (Table 3).

TABLE 3

| Treatment | Height (cm) | # Branches | SFW (g) | SDW (g) |
| --- | --- | --- | --- | --- |
| 20-10-20 | 9.9 ± 3.0 a$^z$ | 13 ± 1 c | 21.1 ± 2.2 c | 2.4 ± 0.4 c |
| CNS | 9.1 ± 1.0 a | 15 ± 2 abc | 23.2 ± 0.3 c | 2.6 ± 0.1 bc |
| 1% P—Al$_2$O$_3$ | 10.4 ± 1.8 a | 17 ± 1 a | 29.4 ± 1.8 b | 3.2 ± 0.2 a |
| 2% P—Al$_2$O$_3$ | 9.8 ± 2.2 a | 14 ± 2 bc | 29.7 ± 2.3 b | 3.1 ± 0.2 a |
| 4% P—Al$_2$O$_3$ | 9.6 ± 2.5 a | 17 ± 1 a | 28.9 ± 3.6 b | 3.0 ± 0.4 ab |
| 8% P—Al$_2$O$_3$ | 9.0 ± 1.2 a | 16 ± 1 ab | 30.7 ± 2.7 ab | 3.2 ± 0.3 a |
| 12% P—Al$_2$O$_3$ | 9.9 ± 3.1 a | 17 ± 1 ab | 33.0 ± 3.5 a | 3.3 ± 0.4 a |
| 16% P—Al$_2$O$_3$ | 10.7 ± 2.0 a | 17 ± 2 a | 28.9 ± 3.0 b | 2.9 ± 3.0 ab |
| Analysis of Variances | | | | |
| F value | 0.28$^{NS}$ | 3.8 | 12.43 | 4.82 |
| P value | 0.96 | 0.008 | 0.001 | 0.002 |

$^z$Mean of four plants ± standard deviation of the mean.
Mean separation within columns by Waller-Duncan's k-ratio t test.
Means within a column with identical lower case letters are not different at the 5% significance level.
$^{NS}$ = Not significant at the 5% significance level.

The percentage of P content in shoots, roots and whole plant increased as the mount of P-Al$_2$O$_3$ applied increased (Table 4). The 16% P-Al$_2$O$_3$ had the highest P content in shoots, and the 1% treatment the lowest. There was no difference in the shoot P content among 2, 4, and 8% P-A$_2$O$_3$.

TABLE 4

| Treatment | Shoot | Root |
| --- | --- | --- |
| 20-10-20 | 1.2 ± 0.14 ab$^z$ | 0.9 ± 0.08 a |
| CNS | 0.8 ± 0.13 c | 0.5 ± 0.04 c |
| 1% P-Al$_2$O$_3$ | 0.7 ± 0.04 d | 0.3 ± 0.03 d |
| 2% P-Al$_2$O$_3$ | 0.9 ± 0.04 c | 0.4 ± 0.03 d |
| 4% P-Al$_2$O$_3$ | 0.9 ± 0.07 c | 0.5 ± 0.02 c |
| 8% P-Al$_2$O$_3$ | 0.9 ± 0.05 c | 0.5 ± 0.06 bc |
| 12% P-Al$_2$O$_3$ | 1.1 ± 0.12 b | 0.6 ± 0.04 b |
| 16% P-Al$_2$O$_3$ | 1.3 ± 0.11 a | 0.6 ± 0.06 bc |
| Analysis of Variances | | |
| F value | 19.41 | 42.39 |
| P value | 0.0001 | 0.0001 |

$^z$Mean of four plants ± standard deviation of the mean. Mean separation within columns by Waller-Duncan's k-ratio t test. Means within a column with identical lower case leters are not different at the 5% significance level.

This study assumed that the total amount of P applied to the medium throughout five weeks of the growing season was 100%. According to this scale, more than 70% of the applied P was leached from the media in the 20-10-20 and nutrient solution control treatments, and less than 30% of the P applied was taken up by plants. (Table 5). The P leached from P-Al$_2$O$_3$ amended media was comparably low, 2% of the applied P in the 1% treatment and less than 2% in the higher amendment treatments.

Table 5 shows phosphorus distribution in plant, leachate, and media. The amount (mg) of P was measured from plant tissue and leachate. The total P applied from 20-10-20 and solution was calculated from their P content; P applied from P-Al$_2$O$_3$ was calculated by sorption curves for P-Al$_2$O$_3$, which desorbed approximately 5000 µmol of P per gram of $Al_2O_3$ when alumina was saturated with P. The amount of P left in the media was estimated by subtracting measured P from total P. The percentage term in plant, leachate, and media was based on the total P being 100%.

solution containing no P, so the only P source for the experimental treatments was from the $P-Al_2O_3$. Alumina was charged with two levels of phosphorus giving two levels of P-desorption (low P and medium P). The amounts of

TABLE 5

| Treatment | Total P mg (100%) | Plant mg (%) | Leachate mg (%) | Media mg (%) |
|---|---|---|---|---|
| 20-10-20 | 138 | 32 ± 2 b$^z$ (22.9) | 102 ± 2 b (74.0) | 4 ± 3 g (3.1) |
| CNS | 77 | 23 ± 2 d (29.6) | 56 ± 3 d (72.4) | 2 ± 5 g (0.0) |
| 1% P—$Al_2O_3$ | 911 | 23 ± 3 d (2.6) | 19 ± 2 e (2.1) | 869 ± 5 f (95.4) |
| 2% P—$Al_2O_3$ | 1823 | 28 ± 1 c (1.5) | 30 ± 3 e (1.6) | 1765 ± 2 e (96.8) |
| 4% P—$Al_2O_3$ | 3647 | 28 ± 4 c (0.8) | 55 ± 11 d (1.5) | 3563 ± 11 d (97.7) |
| 8% P—$Al_2O_3$ | 7291 | 31 ± 1 b (0.4) | 75 ± 6 c (1.0) | 7185 ± 7 c (98.6) |
| 12% P—$Al_2O_3$ | 10937 | 38 ± 3 a (0.4) | 93 ± 2 b (0.9) | 10805 ± 2 b (98.8) |
| 16% P—$Al_2O_3$ | 14582 | 39 ± 4 a (0.3) | 137 ± 20 a (0.9) | 14406 ± 24 a (98.8) |
| Analysis of Variances | | | | |
| F value | | 34.55 | 82.58 | 9999.9 |
| P value | | 0.0001 | 0.0001 | 0.0001 |

$^z$Mean of four plants ± standard deviation of the mean.
Mean separation within columns by Waller-Duncan's k-ratio t test.
Means within a column with identical lower case letters are not different at the 5% significance level.
$^{NS}$ = Not significant at the 5% significance level.

Examples Demonstrating Manipulation of Root Growth with Phosphorus

Methods

Three species, marigolds, tomato and impatient were grown in low-P peat media using nutrient solutions containing three levels of P to create a range of P effects on root proliferation. In a parallel experiment a minor portion of the plants was grown in sand culture to trace the root to shoot ratio and was harvested at the marketable stage of development which is considered to be when the plants contain 1–2 dusters of flowers for tomatoes or 3–6 open flowers for impatient and marigold.

The plants were divided in three groups when they reached the marketable stage of development:

1. To investigate if the different P-levels effect drought tolerance, the media in ⅓ of the plants were allowed to dry gradually until wilting was observed, and then rehydrated. Closure of stomata is believed to be a short term response in plants subjected to drought mediated by physiological active messages from roots to minimize damage to shoot tissues by reducing evapotranspiration during water shortage. Therefore, severity of drought stress was assessed by measuring midday stomatal conductance in the latest matured leafs with a Delta-T Mk3 porometer, Cambridge, England.

2. Another ⅓ of the plants were either placed in a climate chamber with low light levels at 8 µmol m$^{-2}$ (1000 lux) for 12 hours and 22° C., or placed in darkness and 16° C. for 4 days, to simulate transportation before they joined the other half in the climate chamber.

3. The remaining ⅓ was left unstressed in the greenhouse as controls.

The number of flowers and wilted flowers was recorded along with the height and diameter once a week in all cultivars. All plants were harvested weeks later to record dry weight (DW) and leaf area. This was also done to a small sample of plants at the marketable stage of development.

Control plants were grown in low-P peat commercial fertilized with a P concentration of 1.5 mM. The experimental treatments were grown in peat media amended with P charged alumina (P-$Al_2O_3$) and fertilized with a nutrient P-$Al_2O_3$ amendment for the treatments were 2% by volume of the medium. P levels in excess water squeezed from pot soil with plants was:

High-P control: 133±25.9 ppm, pH 4.5
Medium-P: 16.1±10.3 ppm, pH4.5–5.0
Low-P: 5.5±1.0 ppm, pH 4.5–5.0

When the plants reached the marketable stage, they did not receive any nutrients in the irrigation water for the rest of the experimental period. A design with six plants in a block (five plants in the drought experiment) was used. Data was analyzed using a PC statistical package.

Results

High levels of Al in the growth media can be toxic to roots especially at low pH. However, the roots did appear healthy without signs of damage due to the solid-phase P-$Al_2O_3$ amended in the pot soil. The root distribution was very uniform in the pots amended with P-$Al_2O_3$. This was expressed by the roots keeping the depotted clod well together even when shook. On the other hand, the clod on the control plants tended to fall apart when the pot was removed, with large areas not even exploited by the roots.

Impatient

Figure 10A:
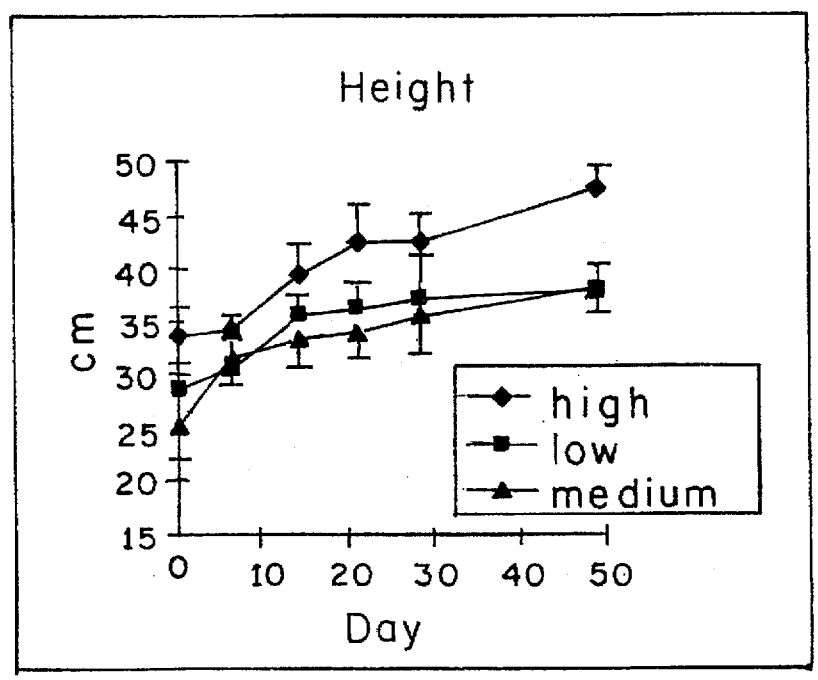
FIG. 10A shows the height of Impatiens grown in traditional media (high-P) and in two P levels for P-$Al_2O_3$ amended media.
Figure 10B:
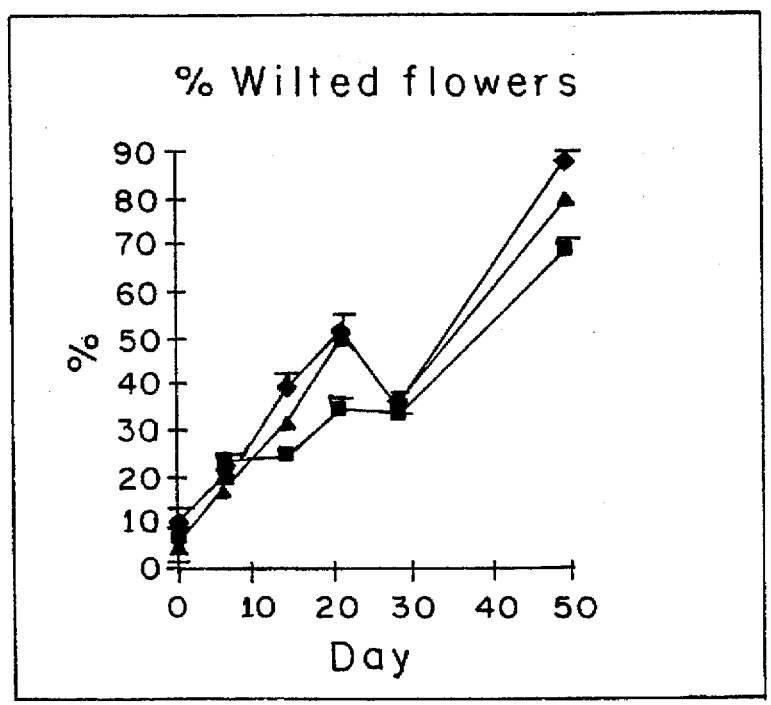
FIG. 10B shows the % wilted flowers for Impatiens grown in traditional media (high-P) and in two P levels for P-$Al_2O_3$ amended media.

The seeds were germinated December 6 and bud break occurred after 51 days±1 day. The development of marketing (day 0) was reached 97 days after germination. Plants kept under low light conditions were harvested 49 days after development of marketing was reached. At day 0, only the diameter of the control plants was significantly higher than that for the plants subjected to the low and medium P treatments. Plants treated with low and medium P were significantly more compact than control plants, as the height was the same for all P levels and the diameter was significantly larger in control plants at both day 0 and day 49 (Table 6, FIG. 10A). Plants treated with low P had significantly, more flowers after 49 days than medium P treated plants, and control plants had the lowest number of flowers, and the number of flowers was higher in plants that were transport simulated. The % wilted flowers was lowest in low P plants and highest in control plants (FIG. 10B). The leaf area was significantly higher in the control plants than in low and medium P plants at day 49. Dry weight was significantly higher in the control plants both at day 0 and day 49 (Table 6).

TABLE 6

| Response | Day 0 | Day 49 | | |
| --- | --- | --- | --- | --- |
| | P | si/st | P | si/st × P |
| Height | ns | ns | ns | ns |
| Diameter | 0.01 | ns | 0.05 | ns |
| Flowers | ns | 0.05 | 0.05 | ns |
| % Wilted Flowers | ns | ns | 0.01 | ns |
| Leaf Area | ns | ns | 0.01 | ns |
| Dry Weight | 0.01 | ns | 0.01 | ns | ns = not significant at the 0.01 level

Figure 11:
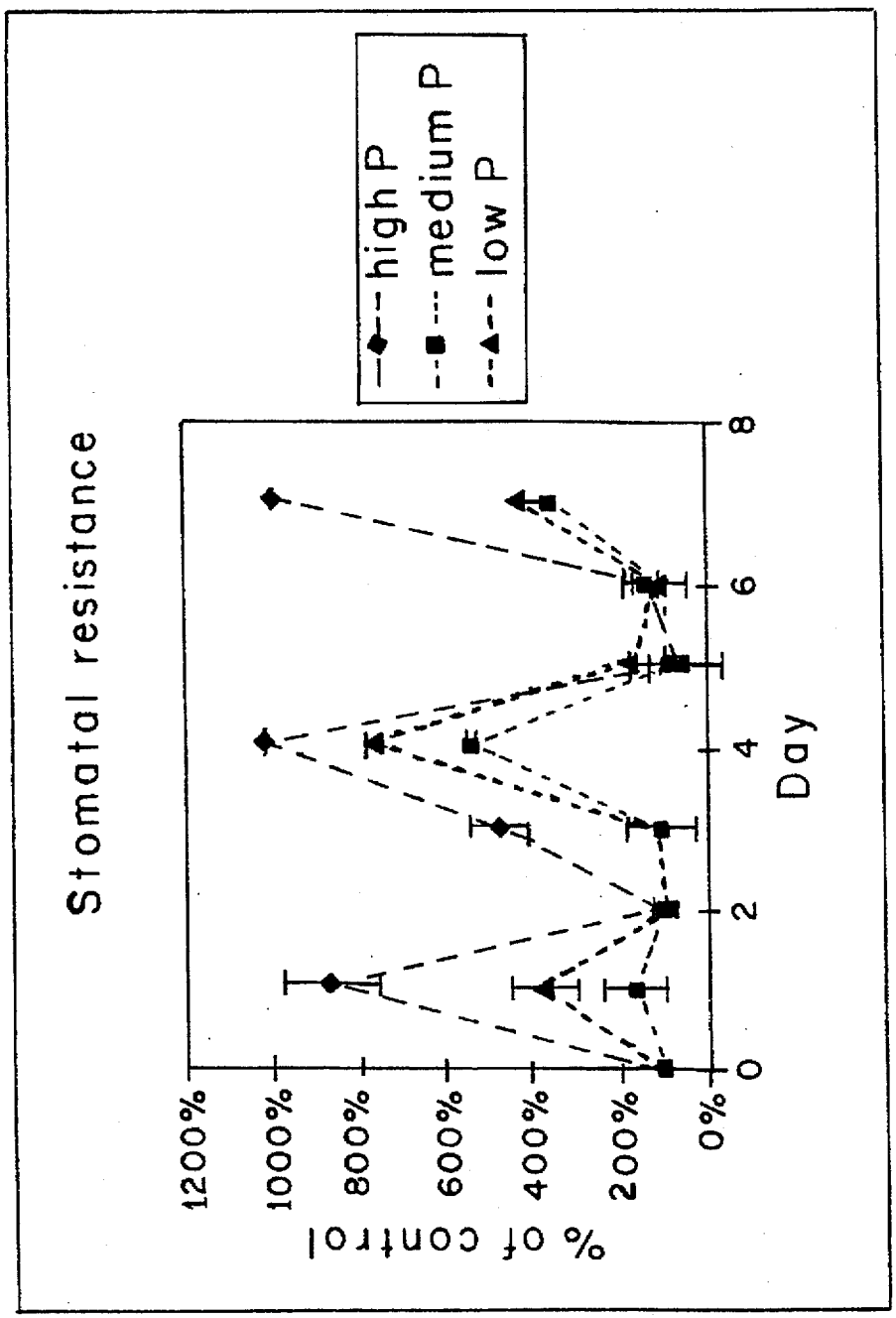
FIG. 11 shows the stomatal resistance of Impatiens grown in traditional media (high-P) and in two P levels for P-$Al_2O_3$ amended media.

Plants placed in the greenhouse were harvested after 29 days and compared to plants that were subjected to drought. No interactions between drought treatment and P levels occurred, indicating that low P levels do not alter the recorded response parameters when subjected to drought. However, leaf conductance got much higher and got there sooner in control plants than in low and medium treated plants, indicating a severer drought stress in the control plants, which could not be explained by a larger leaf area (Table 7, FIG. 11).

TABLE 7

| Response | dr/n-dr | P | dr/n-dr × P |
| --- | --- | --- | --- |
| Height | 0.05 | 0.05 | ns |
| Diameter | ns | 0.05 | ns |
| Flowers | ns | 0.05 | ns |
| % Wilted Flowers | ns | 0.01 | ns |
| Leaf Area | 0.01 | ns | ns | ns = not significant at the 0.01 level

Marigold

Seeds were germinated January 3 and bud break occurred after 46±2 days. The development of marketing (day 0) was reached 59 days after germination. Plants kept under low light conditions and plants kept in the green house were harvested 39 days after the development of marketing was reached. No difference was found between the plants kept under constant low light, st and si therefore were regarded as the same treatment. The height of the plants was only effected by the light levels, thus, the plants in the greenhouse were significantly higher than plants kept under low light conditions. The same was true for the diameter except that the diameter also was significantly higher in the greenhouse plants at day 0 (Table 8). The number of flowers was higher in the greenhouse plant, but did not lead to a higher % of wilted flowers after 39 days compared to plants under low light conditions. The leaf area was smaller in low P treated plants increasing with higher P treatment when kept under low light conditions. Dry Weight was much higher in plants kept in the greenhouse under high light conditions which is partly explained by the fact that these plants were higher.

TABLE 8

| Response | Day 0 | Day 39 | | |
| --- | --- | --- | --- | --- |
| | P | si/st/g | P | si/st × P |
| Height | ns | 0.01 | ns | ns |
| Diameter | 0.01 | 0.01 | ns | ns |
| Flowers | ns | 0.05 | ns | ns |
| % Wilted Flowers | ns | ns | ns | ns |
| Leaf Area | ns | ns | 0.01 | ns |
| Dry Weight | 0.01 | ns | 0.01 | ns | ns = not significant at the 0.01 level

Figure 12A:
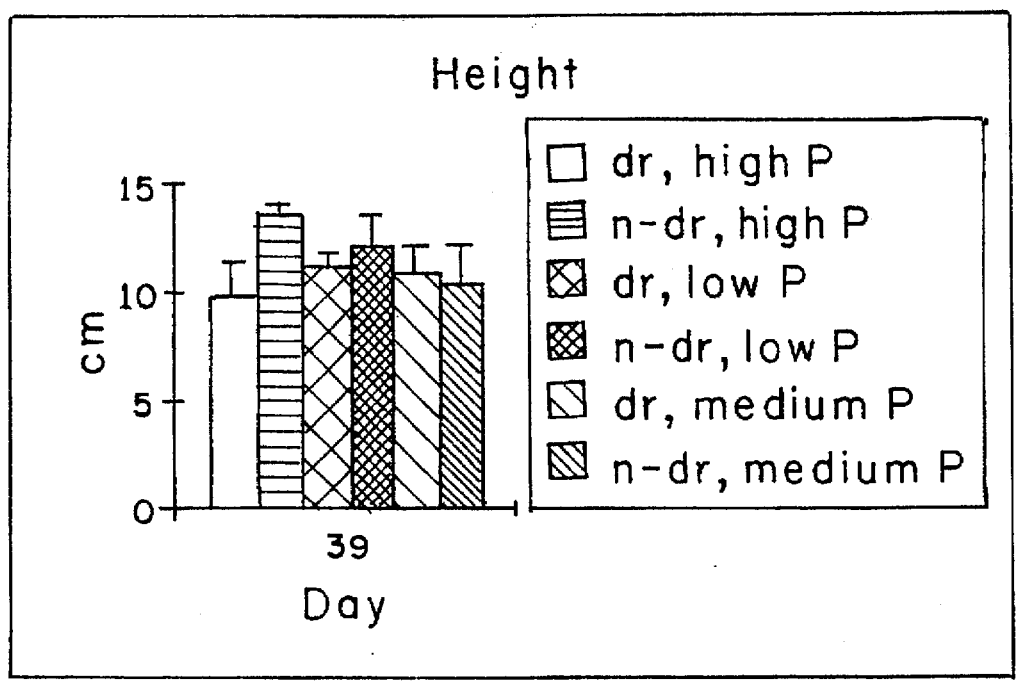
FIG. 12A shows the height of Marigolds grown in traditional media (high-P) and in two P levels for P-$Al_2O_3$ amended media. "dr"=subjected to drought stress, "n-dr"= not subjected to drought stress.
Figure 12B:
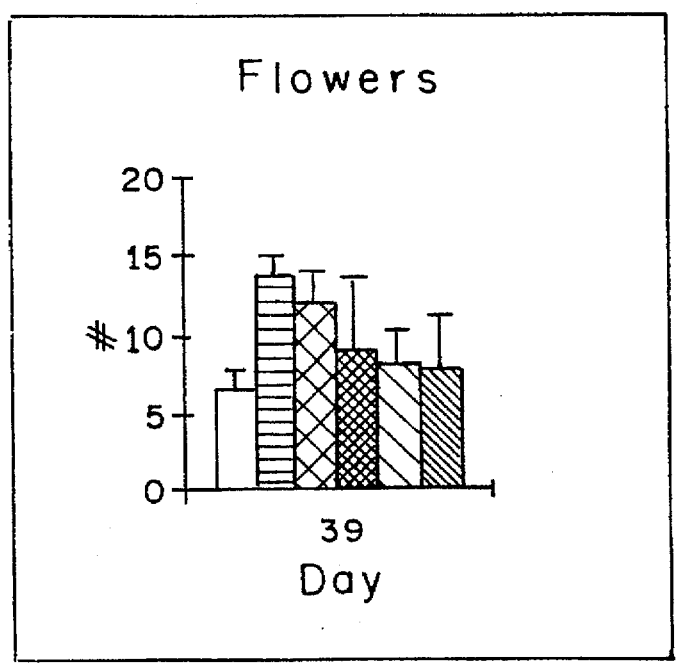
FIG. 12B shows the # of flowers for Marigolds grown in traditional media (high-P) and in two P levels for P-$Al_2O_3$ amended media.

The height of the plants was higher in the non-drought treated plants though the difference was only significantly smaller in the control plants subjected to drought, with little difference in diameter (FIG. 12A). Drought treatment only caused a decrease in number of flowers in the high P control plants. The % of wilted flowers was not affected by the drought treatment (FIG. 12B). The non-drought stressed plants showed the familiar low P response with a smaller left area, on the other hand, plants that were subjected to drought leaf area were largest in low P compared to high P control plants (Table 9).

TABLE 9

| Response | dr/n-dr | P | dr/n-dr × P |
| --- | --- | --- | --- |
| Height | 0.01 | ns | 001 |
| Diameter | ns | ns | ns |
| Flowers | ns | ns | 0.01 |
| % Wilted Flowers | ns | ns | ns |
| Leaf Area | ns | ns | 0.01 | ns = not significant at the 0.01 level

Tomato

Seeds were germinated January 9 and bud break occurred after 62±2 days. The development of marketing (day 0) was reached 65 days after germination. Plants kept in the greenhouse were harvested 21 days after the development of marketing was reached and compared to plants subjected to drought. Plants kept under low light conditions were harvested 51 days after the development of marketing was reached. Height of the pants, number of nodes, number of flowers and the % of wilted flowers was not affected by any of the treatments. The leaf area was larger in high P control plants and plants kept in darkness (transport simulated) before being placed in a low light climate chamber had a larger leaf are than plants kept under constant low light levels. Dry weight Was higher in High P control plants and was higher when the plants had been transport simulated. The same applied for fruit dry weight (Table 10).

TABLE 10

| Response | Day 0 | Day 39 | | |
| --- | --- | --- | --- | --- |
| | P | si/st | P | si/st × P |
| Height | ns | ns | ns | ns |
| # of Nodes | ns | ns | ns | ns |
| Flowers | ns | ns | ns | ns |
| % Wilted Flowers | — | ns | ns | ns |
| Leaf Area | 0.01 | 0.01 | 0.01 | ns |
| Dry Weight | 0.05 | ns | 0.01 | ns |
| Fruit Dry Weight | — | 0.05 | 0.01 | ns | ns = not significant at the 0.01 level

The low P treated plants did not perform any different from high P control plants when subjected to drought. P concentration only caused higher plants, bigger leaf area and more wilted flowers. The High P control plants did dry out faster than the low P treated plants, which also could be seen in a higher stomatal resistance in the high P control plants (Table 11).

TABLE 11

| Response | dr/n-dr | P | dr/n-dr × P |
|---|---|---|---|
| Height | ns | 0.01 | ns |
| # of Nodes | ns | ns | ns |
| Flowers | ns | ns | ns |
| % Wilted Flowers | ns | 0.01 | ns |
| Leaf Area | ns | 0.01 | ns | ns = not significant at the 0.01 level

Conclusions

Growing Impatiens under low P nutrition with P-Al$_2$O$_3$ results in more compact plants as the diameter of the individual plant decrease as compared to plants irrigated with P concentrations employed in commercial horticulture. Meanwhile, the leaf area is smaller in the low P and medium P treated plants. The medium P treated plants still cover the canopy efficiently, where low P treated plants tend to appear too open in the canopy. As number of flowers was higher and % wilted flowers lower in low P and medium treated plants after 49 days, it can be concluded that plants grown under low but sufficient levels of P perform as well as plants grown under traditional commercial fertilization methods with higher P concentrations and even tend to have a better longevity, at least when kept under low light conditions. Drought only caused a smaller leaf area without affecting the other recorded parameters, and the low P treatment did not alter this response.

Marigolds grown in P-Al$_2$O$_3$ amended media under low P concentrations performed as well as control plants grown under traditional P concentrations used in commercial horticulture. Only dry weight was significantly lower in the low P treated plants which can partly be explained by a smaller leaf area. When the plants are subjected to drought and irrigated with commercial high concentrations of P the height, number of flowers and the leaf area were smaller than in plants irrigated normally. On the other hand, low P treated plants did not respond to drought. This can be explained by an altered response to drought by the low P treatment, resulting in a lesser stress load from the drought. This is also clear from the stomatal resistance that increases more rapidly in the high P treated control plants indicating a severe stress response due to drought. The reason to the altered drought response is low P treated plants is unclear but can be explained by a more extensive exploration of the pot soil by the roots, thus being able to extract excessive soil water more efficiently.

Tomato plants grown in P-Al$_2$O$_3$ amended media under low P concentrations develop a smaller leaf area and a thinner stem than high P control plants giving them a less compact appearance. This is partly compensated if the plants are kept in darkness for a few days at the stage of marketing. The low P treatment causes a smaller fruit yield (expressed by dry weight). Plants kept in the greenhouse were harvested earlier than the plants kept under low light so they can not be directly compared to the plants grown under low light levels. Any how, when grown in the greenhouse under high light levels, no difference in fruit yield was measurable after 29 days, when the plants were harvested. On the other hand, leaves of low P treated plants in the greenhouse and, to a lesser extent, in the low light growth chamber appeared darker probably due to an anthocyanin response known to occur during low P conditions, thus, the cause is not well understood. Again the root proliferation is more extensive and distribution is more Uniform in the low P treated plants giving the root clot a more firm appearance, and hindering the soil from falling apart when the pot is removed.

Generally it can be concluded that P concentrations as low as 10-20 ppm is efficient for cultivars of Marigold and Impatient, though medium P concentrations seemed to be the optimal in Impatient. Tomatoes do not produce as many fruits when grown under low P and the plants appear to be 'skinny', at least in the low P range investigated here. Low P levels tend to cause a better root distributions in the pots giving them a better start when transplanted in to the garden or landscape. This is probably due to the lag of a P gradient guiding the roots to certain areas or preventing the roots from proliferating in areas with lower P concentrations which occurs when traditional irrigation strategies are used. It is also observed that the low P treated plants are more resistant to drought than high P control plants, thus, irrigation can be withheld for longer periods before wilting. The reason for this is not clear, though the above mentioned ameliorated root proliferation by low P treatment might cause a more efficient water utilization as the soil dries out. More over, it has been shown that stomatal operature might be more sensitive to drought because of the low P treatment, although, there is no difference between low P and high P control plants stomatal resistance when well irrigated.

It is to be understood that the foregoing description of specific examples of this invention is made by way of illustration only and is not to be considered as a limitation on its scope.

We claim:

1. A composition for growing plants comprising:
   a) 99.75-50% by volume of soilless growing medium, and
   b) 0.25-16% by volume of modified alumina;
wherein said modified alumina is an alumina containing 1-150,000 ppm phosphorus bound to its surface, and is prepared by contacting an activated alumina with a phosphate for a time sufficient to bind the desired level of phosphorus onto the alumina.

2. A composition according to claim 1 wherein the soilless growing medium comprises a medium selected from the group consisting of peat, bark, vermiculite, perlite, gravel and rock wool.

3. A composition according to claim 2 wherein the soilless growing medium additionally contains sand.

4. A composition according to claim 1 wherein the phosphorus modified alumina provides said medium with a phosphorus concentration that is greater than 27 µM.

5. A method of fertilizing plants, said method comprising providing the plants with a phosphorus concentration that is sufficient for plant growth and nutrition, wherein said phosphorus is obtained from a modified alumina;
and wherein said modified alumina is an alumina containing 1-150,000 ppm phosphorus bound to its surface, and is prepared by contacting an activated alumina with a phosphate for a time sufficient to bind the desired level of phosphorus onto the alumina.

6. A method according to claim 5 wherein the phosphorus modified alumina provides the plants with a phosphorus concentration that is greater than 27 µM.

7. A method of fertilizing plants according to claim 5, said method comprising growing said plants in a composition containing:

a) 99.75–50% by volume of soilless growing medium, and b) 0.25–16% by volume of modified alumina;

wherein said modified alumina is an alumina containing 1–150,000 ppm phosphorus bound to its surface, and is prepared by contacting an activated alumina with a phosphate for a time sufficient to bind the desired level of phosphorus onto the alumina.

8. A method according to claim 7 wherein the soilless growing medium comprises a medium selected from the group consisting of peat, bark, vermiculite, perlite, gravel and rock wool.

9. A method according to claim 8 wherein the soilless growing medium additionally contains sand.

10. A method according to claim 7 wherein the phosphorus modified alumina provides said medium with a phosphorus concentration that is greater than 27 μM.

11. A method according to claim 5 wherein said plants are greenhouse plants, ornamental plants, vegetable transplants, bedding transplants, crops, stadium field turf or golf course turf.

12. A hydroponic method for fertilization of plants, said method comprising:

a) loading a cartridge with modified alumina, b) circulating water through the cartridge to contact the water with said modified alumina thereby providing the water with dissolved phosphorus, and c) delivering said water containing dissolved phosphorus to said plants for fertilization;

wherein said modified alumina is an alumina containing 1–150,000 ppm phosphorus bound to its surface, and is prepared by contacting an activated alumina with a phosphate for a time sufficient to bind the desired level of phosphorus onto the alumina.

* * * * *